(No Model.) 8 Sheets—Sheet 1.

J. CLARET & O. VUILLEUMIER.
ELECTRIC RAILWAY SYSTEM.

No. 588,396. Patented Aug. 17, 1897.

Fig. 1.

WITNESSES
F. W. Wright
J. C. Connor

INVENTORS
Jean Claret
Olivier Vuilleumier
BY
Howson and Howson
THEIR ATTORNEYS (No Model.) 8 Sheets—Sheet 2.

J. CLARET & O. VUILLEUMIER.
ELECTRIC RAILWAY SYSTEM.

No. 588,396. Patented Aug. 17, 1897.

WITNESSES
F. W. Wright.
S. C. Connor.

INVENTORS
Jean Claret
Olivier Vuilleumier
BY
Howson and Howson
THEIR ATTORNEYS (No Model.) 8 Sheets—Sheet 3.

J. CLARET & O. VUILLEUMIER.
ELECTRIC RAILWAY SYSTEM.

No. 588,396. Patented Aug. 17, 1897.

(No Model.) 8 Sheets—Sheet 4.
J. CLARET & O. VUILLEUMIER.
ELECTRIC RAILWAY SYSTEM.

No. 588,396. Patented Aug. 17, 1897.

-WITNESSES-
F. W. Wright
S. C. Connor

INVENTORS
Jean Claret
Oliver Vuilleumier
BY
Howson and Howson
THEIR ATTORNEYS

(No Model.) 8 Sheets—Sheet 5.

J. CLARET & O. VUILLEUMIER.
ELECTRIC RAILWAY SYSTEM.

No. 588,396. Patented Aug. 17, 1897.

WITNESSES
F. W. Wright
S. C. Connor

INVENTORS
Jean Claret
Olivier Vuilleumier
BY Howson and Howson
THEIR ATTORNEYS.

(No Model.) 8 Sheets—Sheet 6.

J. CLARET & O. VUILLEUMIER.
ELECTRIC RAILWAY SYSTEM.

No. 588,396. Patented Aug. 17, 1897.

-WITNESSES-
F. W. Wright.
S. C. Connor

INVENTORS
Jean Claret
Olivier Vuilleumier
BY
Howson and Howson
THEIR ATTORNEYS

THE NORRIS PETERS CO., PHOTO-LITHO., WASHINGTON, D. C.

(No Model.) 8 Sheets—Sheet 7.

J. CLARET & O. VUILLEUMIER.
ELECTRIC RAILWAY SYSTEM.

No. 588,396. Patented Aug. 17, 1897.

WITNESSES
P. W. Wright
J. C. Connor

INVENTORS
Jean Claret
Olivier Vuilleumier
BY
Howson and Howson
THEIR ATTORNEYS

(No Model.) 8 Sheets—Sheet 8.

J. CLARET & O. VUILLEUMIER.
ELECTRIC RAILWAY SYSTEM.

No. 588,396. Patented Aug. 17, 1897.

WITNESSES
P. W. Wright.
S. C. Connor

INVENTORS
Jean Claret
Olivier Vuilleumier
BY
Howson and Howson
THEIR ATTORNEYS

UNITED STATES PATENT OFFICE.

JEAN CLARET AND OLIVIER VUILLEUMIER, OF PARIS, FRANCE.

ELECTRIC-RAILWAY SYSTEM.

SPECIFICATION forming part of Letters Patent No. 588,396, dated August 17, 1897.

Application filed August 4, 1896. Serial No. 601,673. (No model.) Patented in France June 8, 1895, No. 248,015, and in Switzerland December 2, 1895, No. 11,598.

*To all whom it may concern:*

Be it known that we, JEAN CLARET, a citizen of the Republic of France, and OLIVIER VUILLEUMIER, a citizen of the Republic of Switzerland, residing in Paris, France, have invented certain new and useful Improvements in Electric-Railway Systems, (for which we have obtained a French patent, No. 248,015, dated June 8, 1895, and a Swiss patent, No. 11,598, dated December 2, 1895,) of which the following is a specification.

Our present invention consists of certain improvements in the electric-railway system and current-distributers therefor forming the subject of the Letters Patent granted to us August 6, 1895, No. 544,209.

The main object of our invention is to simplify the construction of the current-distributers and to insure more reliable operation than has hitherto been feasible irrespective of the direction in which the vehicle may be moving at the time or of any special conditions or circumstances under which it may be desired to travel, and the said improvements further enable the passage from one current-distributer to the next to be effected with the utmost facility.

Figure 1:
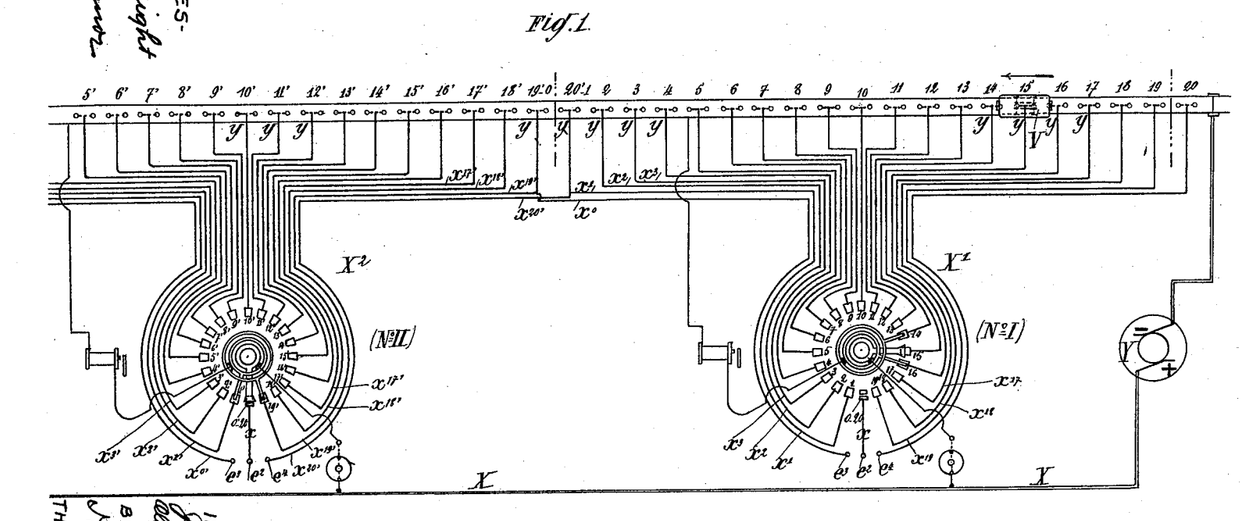
Figure 1 is the diagram of a fraction or length of line arranged for electric traction by means of automatic current-distributers.

Attention is drawn first of all to the fact that in this improved system of electric vehicle traction the two poles of the generator of electricity Y are connected, as indicated in Fig. 1, one to the rails to be traveled on or to a return-wire and the other through a main conductor X to automatic current-distributers $X' X^2 X^3$, &c., arranged along the line at proper distances apart. From these distributers there start current-supply or "feeding" wires $x' x^2 x^3$, &c., leading to and connected with contact-pieces $y' y^2 y^3$, &c., located between the rails of the line and placed at suitable distances apart; and it will also be observed that through the medium of these distributers the contacts are, as the vehicle advances, placed one by one in electrical communication with the main conductor, so that the electric motor on the vehicle receives current through metal runners or "current-receivers," also carried by the vehicle, but insulated from its body, these current-receivers being adapted to brush or rub against the contacts of the line.

We will now describe the construction of the improved current-distributers, after which there will follow a description of the manner in which the said distributers operate in order to fulfil all the conditions upon which the satisfactory locomotion of the vehicle depends.

Figures 2, 3:
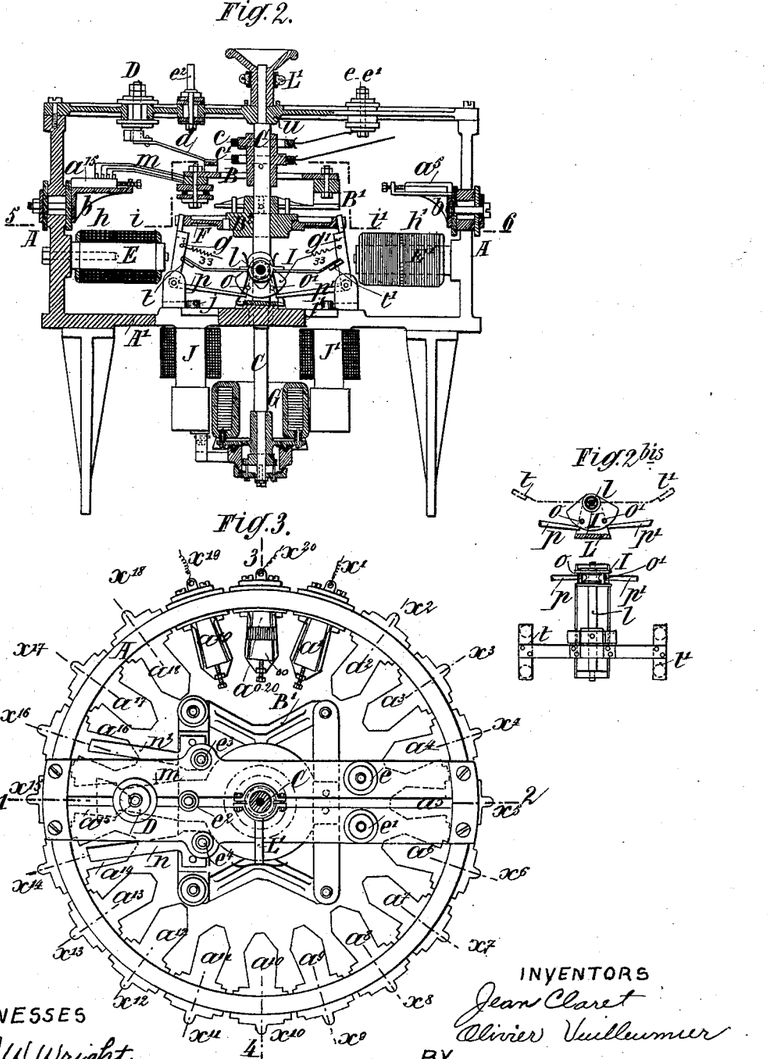
Fig. 2 is a vertical section of one of the automatic current-distributers on line 1 2, Fig. 2, the scale being about one-fourth of the real size. Fig. $2^{bis}$ shows some details of one of the devices forming part of the distributer.
Fig. 3 is a plan or top view of the said distributer. Fig. $3^{bis}$ is a horizontal section on line 5 6, Fig. 2.
Figure 3:
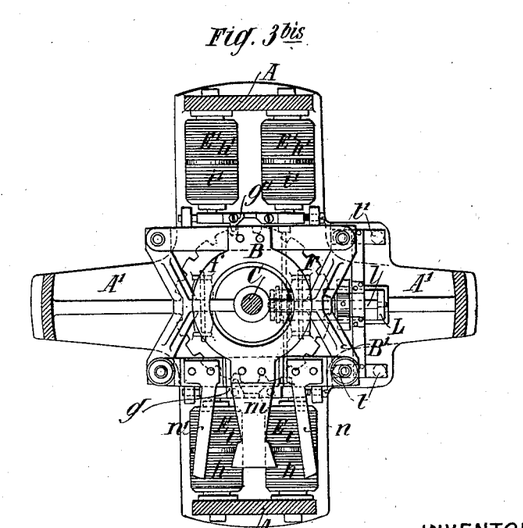
Figure 4:
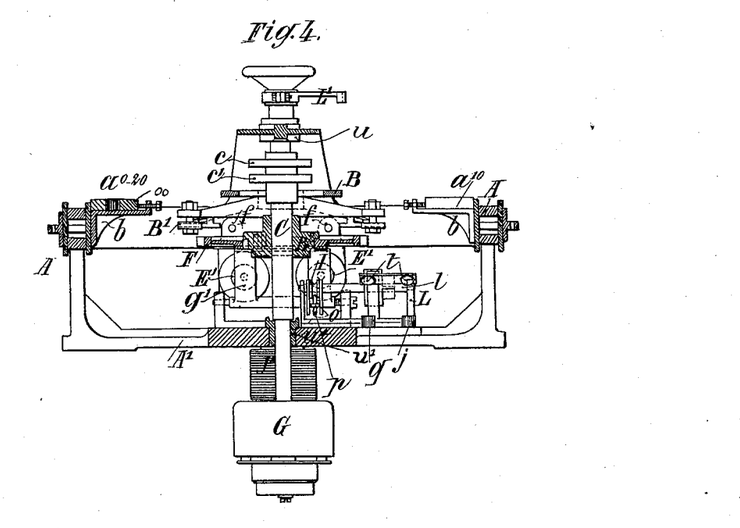
Fig. 4 is another vertical section on line 3 4, Fig. 3.

The automatic current-distributers, one of which is shown by way of example in Figs. 2, 3, and 4, comprise a ring A, forming part of a frame A', supporting the apparatus. On this ring A are mounted a number of keys or switches $a^0$ to $a^{20} a' a^2$, &c., the number of keys being equal to the number of contact-pieces on the line, which is supposed to be twenty in the example shown. These keys or switches are suitably insulated from the said ring A and connected by wires $x^0$ to $x^{20} x' x^2 x^3$, &c., to the corresponding contact-pieces of the line $y^0$ to $y^{20} y' y^2$, &c., respectively. Each key is formed of a block of carbon fitted and retained by any suitable means within a metal support $b$, but the key $a^0$ (being at the same time the key $a^{20}$) is smaller or shorter than the remaining keys $a'$ $a^2$, so that it can be touched only by the arms $n\,n'$, hereinafter described, while the arm $m$ only communicates with a part $o\,o$, Figs. 3 and 4, which does duty for its support, but to which no wire is connected. Over these keys or switches, arranged in a circle and all in the same plane and in frictional contact with them, Figs. 2, 3, and $3^{bis}$, there travels the arm $m$ aforesaid, (termed the "large" or "main" switch-arm,) formed of a number of superposed resilient metal plates firmly attached or secured to a metal ring B, connected, as shall presently be seen, with a shaft C. This arm $m$ as it turns is adapted to contact with all the keys in succession except the key $a^0$ to $a^{20}$, of which it can only touch the internal portion $o\,o$, entirely insulated from the line. The arm $m$ is, moreover, made wide enough to touch any two adjacent keys whenever it passes from one key to the next. Over the same keys and in frictional contact with them there travel the two further switch-arms $n$ and $n'$, already mentioned, arranged symmetrically to the main switch-arm $m$ and constructed similarly to the latter. These arms $n\,n'$ are mounted upon the boss or nave $B^2$ of the wheel or cross-shaped frame $B'$, whereby they are connected to the shaft C, to be more fully described farther on, and while they are properly insulated the said switch-arms as they turn are adapted to touch all the keys $a'$ $a^2$, &c., but only the outer part of the switch $a^0$ to $a^{20}$, and they are electrically connected by wires with corresponding rings $c\,c'$, which are mounted upon the shaft C and properly insulated both from each other and from the said shaft C.

In frictional contact with the ring B there are adapted to move one or more fingers $d$, connected to an insulated post D, electrically connected with the main conductor X, which controls the line throughout its length, there make contact with the rings $c$ and $c'$, contact brushes or fingers connected, respectively, to insulated binding-posts $e$ and $e'$, whence there extend the wires respectively wound upon the electromagnets E and $E'$, to which further reference shall be made presently.

The ring B is supported by the cross-frame $B'$ mentioned above, and upon its boss $B^2$, securely keyed or fastened on the shaft C, there is mounted a notched or toothed wheel F. This notched or toothed wheel is mechanically connected to the boss $B^2$ through the medium of india-rubber plugs $f$, with a view to allow a certain resiliency or yielding action of the said wheel F upon the boss $B^2$ in a rotary direction. The notched wheel is engaged by two arms $g\,g'$, forming the armature-levers of the two electromagnets E $E'$, respectively. The cores of these magnets are rigidly secured to the uprights of the cross-frame $A'$. When at rest, the said armature-levers $g\,g'$ are acted upon by the springs 33, adapted to oppose the magnetic action of the electromagnets and to tend to engage the armature-levers with the notched wheel F.

Figure 5:
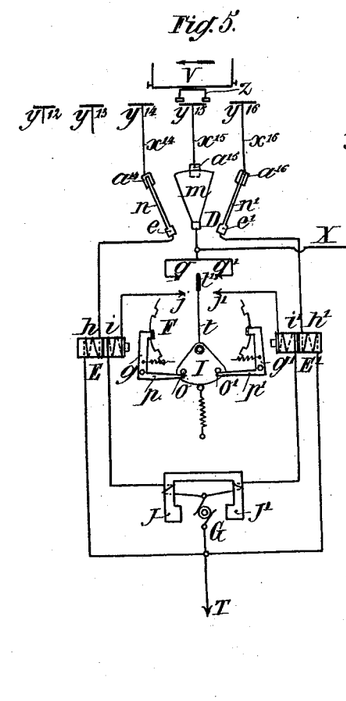
Figs. 5, 6, 7, 8, and 9 are diagrams illustrative of the operation of the distributers. Figs. $5^a$ and $5^b$ are diagrams of modifications.
Figure 5A:
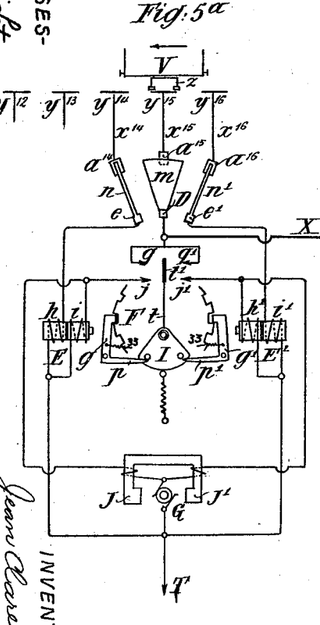
Figure 5B:
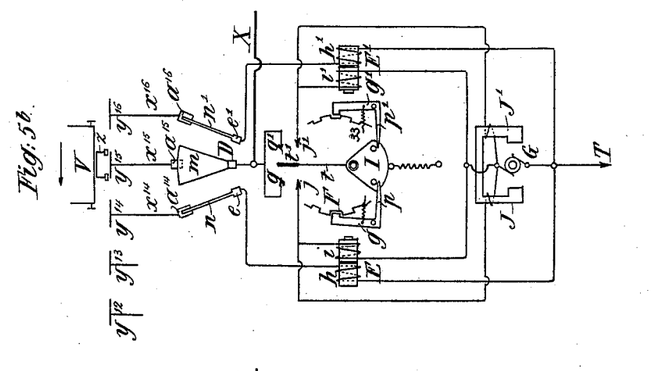
Figure 6:
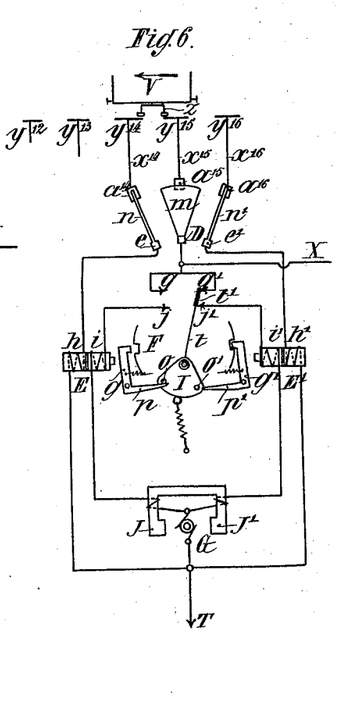

The electromagnets possess each two separate and independent windings $h\,i$, ($h'\,i'$,) the windings $h\,h'$ coming from the posts $e\,e'$, Figs. 5 and 6, and the fingers adapted to bear on the rings $c\,c'$, respectively, and leading to the return wire or rail, while the windings $i\,i'$ start from the contact-pieces $j\,j'$, symmetrically disposed on either side of an escapement I, presently to be described, and they extend to an electric motor J $J'$ G, secured to the lower part of the frame $A'$. The movable part G of the motor is rigidly secured to the shaft C, which carries the entire movable energy-distributing arrangement, and is supported at the top and bottom by suitable bearings, such as $u\,u'$. The windings $i\,i'$ extend to the stationary portion J $J'$ of the electric motor, the movable part G of which is connected with the return wire or rail. This electric motor is adapted, as will presently be seen, to impart rotary motion to the shaft C in either direction, as the case may be, as soon as the armature-levers $g\,g'$ are disengaged from and release the notched wheel F. While the current-distributer is at rest, the electric motor is subject to no tension. Instead of connecting the windings $i\,i'$ to the inductor-coils J $J'$ in series they may be connected in parallel, as illustrated in the two modifications shown in the diagrams Figs. $5^a$ and $5^b$.

The escapement I mentioned above is formed of, first, two plates or pallets mounted upon a horizontal shaft $l$, Figs. 2, $2^{bis}$, and 4, journaled in a support L, and provided with two pins O $O'$ and a contact-plate $t\,t'$, keyed upon but insulated from the said shaft $l$ and lying in the plane of the contact-pieces $j\,j'$, arranged symmetrically on either side of the escapement; and, second, two arms $p\,p'$ on the armature-levers $g\,g'$, respectively.

The contact-pieces $j\,j'$ are supplemented by other contact-pieces $q\,q'$, connected by a wire to the binding-post D, Figs. 5 and 6; or the additional contacts $q\,q'$ may be dispensed with and the contact-plate $t'$ may instead be electrically connected to the said post D. The rod $t$ of the escapement is adapted, by the oscillation of the main escapement device or pallet I, to make contact between the pieces $j$ and $q$, or between the pieces $j'$ and $q'$, as the case may be, in the manner presently to be explained. A spring or springs 44, Figs. 7, 8, and 9, or any other suitable means may be employed to constantly tend to move the pallet I back to the vertical position.

Figure 10:
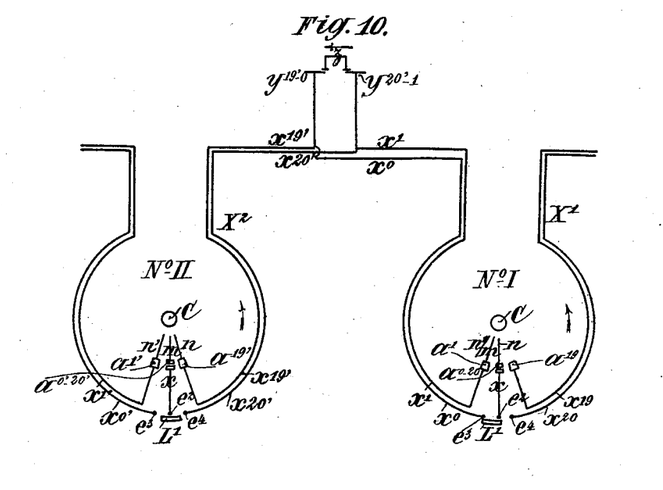
Figs. 10 and 11 indicate, in a diagrammatic form, the course taken by the current in passing from one distributer to the next.
Figure 11:
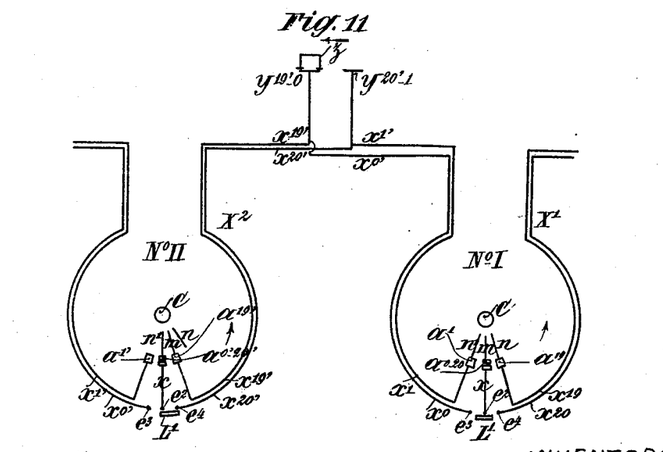

To the upper part of the vertical shaft C, above the cross-piece carrying the binding-posts D, $e$, and $e'$, there is secured by means of a collar $a$ a flat spring $L'$, Figs. 2, 3, and 4, adapted to make contact with the posts $e^2\,e^3\,e^4$ as the shaft rotates, Fig. 3. The post $e^2$ is connected, Figs. 1, 10, and 11, with the wire $x$, and consequently with the corresponding key $a^0$ to $a^{20}$. The post $e^3$ is connected by a wire $x^0$, Figs. 1, 10, and 11, with the contact element $19'$ to 0, itself connected with the key $a^{19'}$ of the distributer in advance, No. II, The post $e^4$ is connected by a wire $x^{20}$, Figs. 1, 10, and 11, with the contact element 20 to 1, itself connected with the key $a'$ of the distributer, situated to the rear, No. I. The spring L' or commutating device moves with the shaft C, and therefore with the contact-arms $m\ n\ n'$, and at a given moment establishes electrical connection between the posts $e^2$ and $e^4$ to throw out of circuit at the desired time the different successive distributers, and that no matter in what direction the vehicle may be traveling, as will be more fully described farther on.

Figure 7:
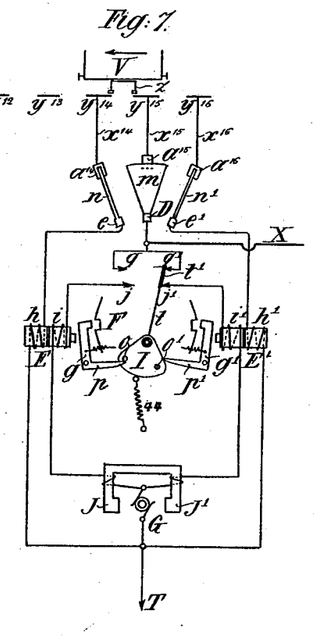
Figure 8:
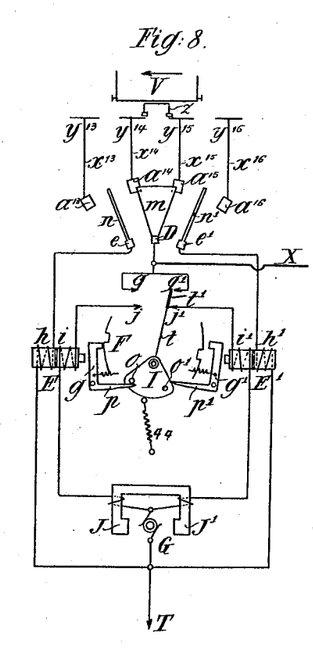

The operation of the current-distributer is as follows: Let it be assumed that at the time of observation the distributer is at rest. This condition of rest prevails either when there is no vehicle on the line or when a vehicle V has its current-receivers fully overlying one of the contact-pieces of the line, as illustrated in the diagram Fig. 5. This being so the notched wheel F is engaged by the armature-levers $g\ g'$. The plate $t\ t'$ of the escapement or pallet I assumes such a position that the contact-pieces $j\ q$ and $j'\ q'$ are electrically disconnected, while the main arm $m$ is either on the switch $a^0$ to $a^{20}$, (where there is no vehicle passing, as shown in Fig. 1 in the case of the distributer No. II,) or upon one of the keys corresponding to the line-contact piece on which there happens to be a vehicle, (in the case of a vehicle traveling on the line, as indicated in Fig. 1 in regard to distributer No. I.) Now let it be supposed, for the purpose of illustration of what follows, that a vehicle happens to be situated upon the contact-piece $y^{15}$—that is to say, that the main switch-arm $m$ is upon the switch or key $a^{15}$. Then the motor on the vehicle V is in communication with the main conductor X through the medium of the binding-post D, finger $d$, ring B, main switch-arm $m$, the key $a^{15}$, whereon such arm rests, the corresponding wire $x^{15}$, the contact-piece $y^{15}$, connected to such wire, and the current-receiver $z$ of the vehicle V, Fig. 5. The electric motor on the vehicle being by such means supplied with the current may be caused to revolve either in one direction or in the other at the driver's will. Supposing now that the vehicle V is traveling in the direction of the arrow, Fig. 5, the consequence will be that the current-receiver $z$ comes in time to bridge over or get astride of two contact-pieces—say contact $y^{15}$ and contact $y^{14}$—as indicated in Fig. 6. The immediate effect of this species of bridge being formed is that a derived current is sent into the contact-piece $y^{14}$, and consequently into the coil $h$ of the corresponding electromagnet E, through the wire $x^{14}$, key $a^{14}$, and arm $n$. Under the influence of this derived current the armature $g$ becomes disengaged from the notched wheel F, while at the same time the arm $p$ of this armature-lever, acting upon the pin $o$ of the escapement, moves the plate or pallet $t\ (t')$ onto the contact-pieces $j'\ q'$ and another derived current, started at the binding-post D, passes into the coil $i'$ of the electromagnet E'. Under the action of this current the armature $g'$ is also disengaged from the said notched wheel F, as illustrated in Fig. 7, and, furthermore, as the coil $i'$ is in series with the coils of the electric motor J, J', and G this latter is set in operation and caused to impart rotary motion to the shaft C, and with it to all the parts or devices it carries—viz., to the notched wheel F and the three arms $m$ and $n\ n'$. Owing to the rotation of the shaft C the arms $m$ and $n\ n'$ move over the keys $a'\ a^2$, &c. At the period of the operation represented in Fig. 8, where the arm $m$ is supposed to be astride of the keys $a^{15}$ and $a^{14}$, the current of the main circuit X is as a result sent through both the contacts $y^{15}$ and $y^{14}$, the switch-arm $n$ being supposed, for example, to be situated between the switches $a^{13}$ and $a^{14}$. This arm, therefore, does not take in any more current, and the electromagnet E releases its armature-lever $g$, which comes to rest upon the wheel F ready to engage in the notch about to meet it. The switch-arms continue in motion until the armature $g$ engages with the next notch of the wheel F. At this juncture, Fig. 9, the arm $p$ of the armature-lever $g$ no longer presses upon the pin $o$ of the escapement I, which, under the action of its controlling-spring 44, tends to resume its position of rest, without, however, being able to reach this position quite, as its pin $o'$ meets with the arm $p'$ of the armature-lever $g'$, Fig. 9. At that moment, too, the contact between the pieces $j'$ and $q'$ is broken and the electromagnet E' releases its armature $g'$, which by pressing upon the pin $o'$ causes the escapement-piece I to slightly swing over toward the said armature, so that the arm $p'$ of the latter can pass underneath. The armature $g'$ being thus set free engages in its turn with the adjacent notch of the wheel F. It will be observed that even though the contact between the pieces $j'$ and $q'$ should be temporarily restored and the current be again allowed to pass through the electromagnet E' and into the coils of the electric motor J J' G, this would not occasion any inconvenience, inasmuch as the wheel F, which is mounted yieldingly on the boss $B^2$, would still be in gear with the armature $g$. The said wheel F is reëngaged, therefore, in the same may as it was assumed to be in Fig. 5, with the only difference that by this time it has performed part of a revolution and that the arms $m$, $n$, and $n'$ are respectively in contact with the keys $a^{14}$, $a^{13}$, and $a^{15}$. The result is that the current from the main conductor X passes through the contact-piece $y^{14}$, thereby enabling the vehicle to proceed in the forward direction until a "bridge" is formed from contact $y^{14}$ to contact $y^{13}$, when the same operations as before will be enacted over again in the same order of succession, and so on until the vehicle stops, such stoppage at the same time causing the operation of the current-distributer to be interrupted. Thus it will be seen that the operation of this device is dependent upon the motion of the vehicle, although at the same time such operation is intermittent, whereas the motion of the vehicle may be continuous and its speed greater or less, as may be desired.

Figure 9:
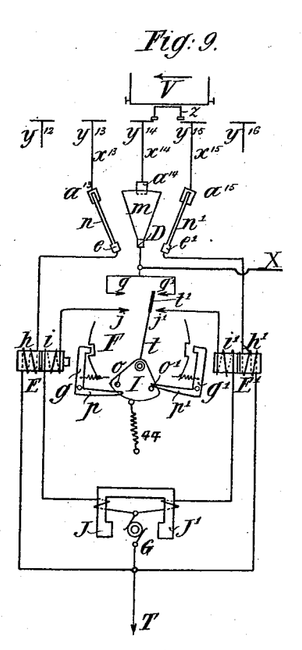

When the driver so reverses the motion of the vehicle as to cause it to move in the direction opposite to that indicated by the arrows in Figs. 5 and 9, the same effects as above stated are produced, except that the operation of the arms $n$ and $n'$ and the accessories connected therewith is reversed also. The wheel F and all the parts attached to the shaft C revolve in the opposite direction. Since it is the coil $i$ that acts upon the motor J J' G instead of the coil $i'$, these two coils or windings being arranged upon the induction-spool J J' so as to develop, when excited, flow of force or energy in opposite directions.

Instead of providing the induction-coil J J' with two windings, as stated, so as to insure the rotary motion of the armature G either in one or the other direction, the said inductor J J' may be a single coil and cause the armature G to turn either backward or forward, reversing the current thereby, either in the inductors or in the armature induced. For this purpose there is fitted to the pivot $l$ of the escapement devices I a commutator forming a substitute for the plate $t\ t'$, intended to make contact between the pieces $j$ and $q$ or the pieces $j'$ and $q'$.

In the foregoing description one single distributer was supposed to be in operation, but it will be understood that most extended lines require a number of such distributers, and in dealing with a case of this kind the question of the passing of the current from one distributer to the next has to be considered. For this purpose each distributer not only covers all the contact elements of its own section, but also extends to one contact element of each adjacent section, Fig. 1, so that, for example, two contacts are superposed over each other, as it were, and connected to two distributers. Thus in Fig. 1 there is shown a contact-piece marked 20 to 1 and another marked 19 to 0, which signifies that the contact-pieces $y^{20}$ to $y'$, connected to the key $a'$ of distributer No. I, is at the same time connected with the key $a^{0'}$ to $a^{20}$ of distributer No. II, and that the contact-piece $y^{19}$ to $y^0$ is connected both to the key $a^0$ to $a^{20}$ of distributer No. I and to the switch $a^{19}$ of distributer No. II.

Besides the switch $a^0$ to $a^{20}$ of each distributer by reason of its being divided, and also of the fact that the arm $m$ does not touch its outer portion or division, cannot supply the said contact-pieces $y^{19}$ to $y^0$ and $y^{20'}$ to $y'$ with current, though these contact-pieces can be so supplied by the next succeeding distributer, owing to the above-mentioned straddling position of the contact-receiver forming a bridge from one contact to the other. This switch $a^0$ to $a^{20}$, however, can receive the "derived" current when the bridge in question forms, and transmit such current to the electromagnet E or E', as has been above set forth, through the medium of either the arm $n$ or the arm $n'$, according to the direction of motion. It will, moreover, be observed, as has been before explained, that the key $a^0$ to $a^{20}$ is not connected directly with the wires $X^0$ and $X^{20}$, which go to the contact elements 19 to 0 and 20 to 1, respectively, Figs. 1, 10, and 11, but this connection, either through the wire $x^0$ or the wire $x^{20}$, is established through the medium of the spring L', before described, and which travels with the contact-arms $m\ n\ n'$.

The key $a^0$ to $a^{20}$ is only connected with the wire $x^0$ when the arm $n$ happens to be upon $a^0$ to $a^{20}$. Then the arm $m$ rests upon the key $a'$, No. I, Fig. 10. On the other hand, this key $a^0$ to $a^{20}$ when the arm $n'$ is upon $a^0$ to $a^{20}$, and then the arm $m$ is on $a^{19}$, No. II, Fig. 11, the object of the arrangement being to enable the distributer to get out of circuit when the vehicle passes on to the next distributer. The effect would, indeed, be the same (so far as the operation of the current-distributer is concerned) were the key $a^0$ to $a^{20}$ connected directly with $x^0$ and $x^{20}$, but then a contact-piece would momentarily be excited, which is not covered by the vehicle. It is for the express purpose of avoiding this temporary excitation that the spring L', acting in combination with the posts $e^2$, $e^3$, and $e^4$, has been arranged on the vertical shaft C, as described above. Supposing then that the arm $m$ of distributer No. I has come onto the key $a'$, (see Fig. 10,) supplying current to the contact-piece $y'$, which is at the same time the contact $y^{20'}$ of the following distributer, or distributer No. II, and that the vehicle is moving in the direction indicated by the arrow, it will be seen that the bridge above referred to will form between the contact-piece $y^{20'}$ to $y'$ and the contact-piece $y^{19'}$ to $y^0$, which is at the same time the contact $y^0$ of the distributer No. I and the contact $y^{19'}$ of the next following distributer No. II. The derived current will then flow both through the key $a^0$ to $a^{20}$ of the distributer No. I (owing to the contact made between the posts $e^2$ and $e^3$ by the spring L') and through the key $a^{19}$ of the distributer No. II. Under the influence of this derived current the two distributers No. I and No. II operate simultaneously, and as to that operation it has already been described. It is sufficient to say that the arms $m$ and $n\ n'$ of these two distributers are set in operation simultaneously and assume the positions indicated in Fig. 11—i. e., the switch-arms of the distributer No. I are brought to their starting positions and the switch-arms of the distributer No. II move up in front of the keys $a^{19}\ a^{18}\ a^{20}$, so that the arm $m$ of the distributer No. II will supply current to the contact-piece $y^{19'}$ to $y^0$, and the vehicle is free to continue its course in the direction of the arrow.

So far as concerns the bringing of the distributer No. I to rest it may be observed that although the plate L' has broken the connection between the posts $e^2$ and $e^3$ before the final position of rest has been reached the movement of the said distributer is continued up to the point of rest by reason of the fact that the electric motor J J' G always receives current from the post D and the contacts $q'$ $j'$ until the armature $g$ has reëngaged the wheel F, as described above.

Nothing special need be said in regard to the rearward motion of the vehicle, all operations taking place exactly as has just been described, for when its motion is reversed a bridge is re-formed between the contacts 19' to 0 and 20' to 1, so that a derived current passes at the same time through the wire $x^{20}$ and the metal plate L' to the key $a^0$ to $a^{20}$ of distributer No. II and through the key $a'$ of distributer No. I. Distributer No. II would then assume its position of rest—i. e., the arms $m$, $n$, and $n'$ would resume the respective positions of $m$ upon $a^0$, of $n$ upon $a^{19}$, and $n'$ upon $a'$ of distributer No. II, whereas distributer No. I would start afresh, supplying the vehicle with energy, its switch-arm $m$ having come back to the key $a'$ of the said distributer.

In Figs. 5, $5^a$, $5^b$, 6, 7, 8, and 9 it has been assumed that the electric motor J J' G is only fed during the operation of the distributer—i. e., during the passage of the switch-arm $m$ from one of the keys to the next.

Figs. 12, 13, 14, and 15 show an arrangement where the motor J, J', and G is supplied with current continuously. This arrangement will prove somewhat important where it is desired to feed the motors of a number of distributers connected together in series.

Figure 12:
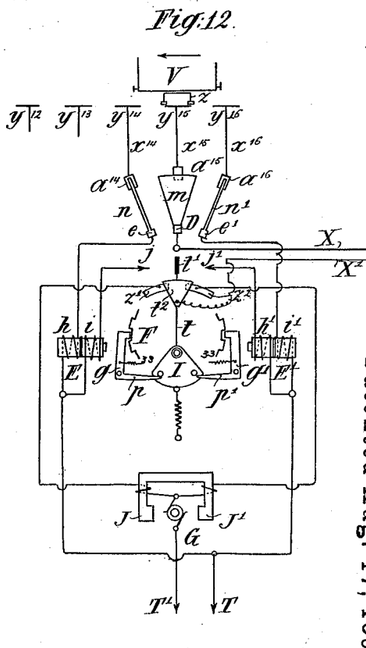
Figs. 12, 13, 14, and 15 represent the distributing arrangement as it appears when the electric motor of the distributer operates in a continuous manner.
Figure 13:
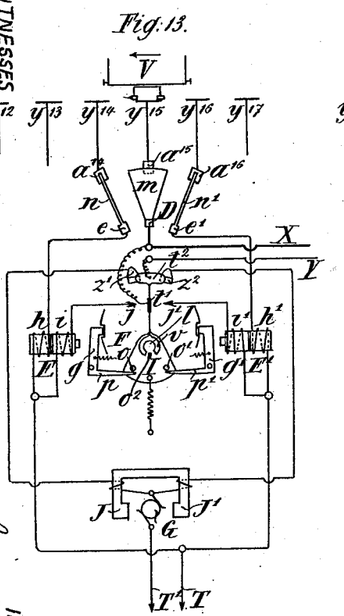
Figure 14:
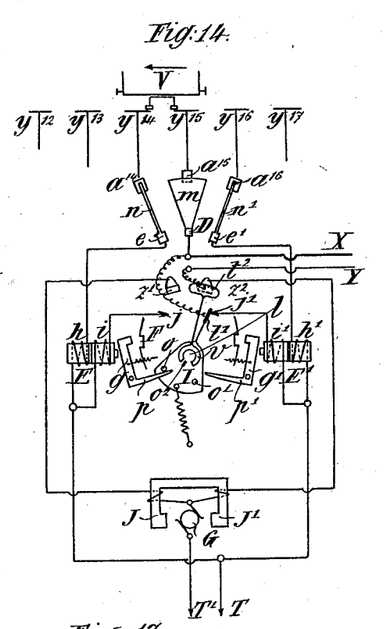
Figure 15:
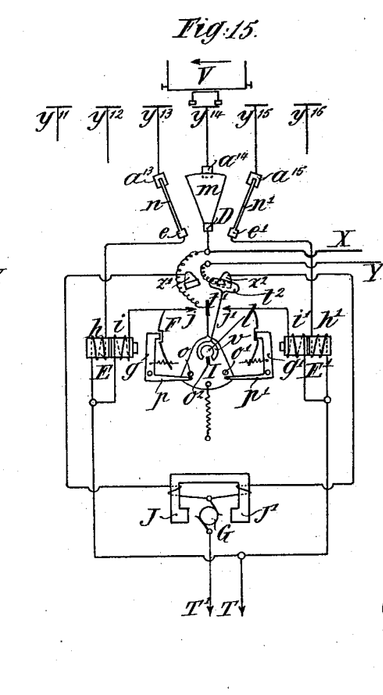

As regards the effort or strain to which the motor is subjected, two alternative cases are to be considered, one of which is embodied in Fig. 12 while the other is illustrated in Figs. 13, 14, and 15.

In Fig. 12 the escapement I is supposed to displace, as it swings to and fro, not only the contact-plate $t$ $t'$, but in addition to that a further plate $t^2$, both plates being rigidly connected with the pivot $l$ of the escapement—say by means of one and the same rod.

While the apparatus is at rest, the plate $t^2$ communicates a current which it receives from a conductor X', passing it onto two blocks $z'$ $z^2$, from which start the wires leading to the induction-coils J J' of the motor. Their connected ends communicate, as before, with one of the brushes of the armature G, while the other brush is connected to an outlet-wire T'. In this condition of things the motor strain in either direction is $nil$; but as soon as the vehicle forms a bridge, as described above with reference to Figs. 6, 7, and 8, the rod will carry the contact-plates $t$ $t'$ and $t$ $t^2$ along with it. $t^2$ will leave $z'$, and the motor now receiving current from $z^2$ will start revolving in the required direction, $t'$ having made contact with $j'$, which in its turn brings about the release of the wheel F.

Figure 16:
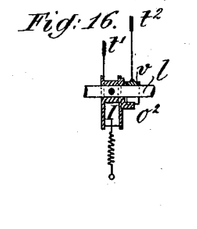
Fig. 16 is a longitudinal section of a modified form of the escapement I.

In Figs. 13, 14, 15, and 16 the commutator-plate $t^2$ is only to a relative extent dependent upon the oscillatory motion of the escapement I. The contact-plate $t^2$, instead of being rigidly connected with the pivot $l$ of the escapement I, is fixed, as shown in Fig. 16, to a sleeve $v$, mounted on the spindle $l$, with slight friction. This sleeve $v$ is provided with a slot, in which there engages a pin or stud $o^2$, integral with the escapement I. The slot of the sleeve $v$ is larger than the pin $o^2$. $t^2$ is fastened onto this sleeve $v$, so that when it makes contact simultaneously with $z'$ and $z^2$ the working of the slot in the sleeve $v$ upon the pin or stud $o^2$ is divided, as illustrated in Fig. 13.

What happens when the vehicle V has formed a bridge between two consecutive contact-pieces, such as $y^{15}$ $y^{14}$, Fig. 14, is this: The escapement I, together with its stud or pin $o^2$, is displaced by the movement of the armature-lever $g$ (with arm $p$) of the electromagnet E. During the first part or stage of this displacement $t^2$ remains stationary in its place, the pin $o^2$ only having completed part of its work in the slot of the sleeve $v$, while during the latter stage of the movement in question the said pin $o^2$ displaces $v$, and by that time the commutator-plate $t^2$ will have come fully into contact with $z^2$; the contact-plate $t$ $t'$, which, as in the instances previously described, is always connected with the escapement I, has now made contact with $j'$ and has thereby sent current through the coil $i'$; the armature $g'$ of the electromagnet E' is attracted, and the wheel F is released. The armature G now begins to turn, carrying the switch-arms $m$ $n$ $n'$ around with it, so that these arms take up their positions upon the keys $a^{14}$, $a^{13}$, and $a^{15}$, respectively. The vehicle as it continues its motion is no longer supplied with electricity, except through $y^{14}$, Fig. 15, the two armatures $g$ $g'$ having reëngaged the notches of the wheel F. While the escapement I, with its contact-piece $t'$, has recovered its symmetrical position in relation to the arms $p$ $p'$ of the armatures $g$ $g'$ and to the contacts $j$ $j'$ of the coils or convolutions $i$ $i'$, the contact-piece $t^2$ has remained in engagement upon $z^2$, because the projection $o^2$, connected with the escapement I, has only shifted to the extent allowed by the slot in the sleeve $v$, wherein it works.

During the whole time taken up by the feeding of the vehicle through the contact $a^{14}$ in question the armature G tends to revolve in the same direction in which it has turned before. This, however, it is unable to do, the wheel F being arrested by the armatures $g$ $g'$. If the vehicle were to proceed in the direction of the arrow, it would form bridges, successively, between $y^{11}$ and $y^{13}$, between $y^{13}$ and $y^{12}$, and between $y^{12}$ and $y^{11}$, and while each of these bridges lasted the escapement I would resume the position represented in Fig. 14, and in each case the plate $i\ t'$ would restore the contact at $j'$, so as to cause $g'$ to become disengaged, and whenever any one of the bridges were broken up the said escapement I would move back to the position indicated in Fig. 15, $t^2$ remaining at the time in engagement with $Z^2$.

If the vehicle were to move backward, all the operations would be the same, except that in this case it would be the armature $g'$, (with arm $p'$,) forming part of the electromagnet E, that would carry along the escapement I. The contact $t^2$ would pass over $Z'$ and would reverse the direction of the motion of the motor.

In all the figures above described it has been seen that the task performed by the coils or windings $i\ i'$ consisted in disengaging the armatures $g\ g'$, respectively, where such armatures were not disengaged by the coils $h\ h'$. In all the preceding figures, in fact, it was assumed that the arrangement comprised one wheel F only. Had the two armatures $g\ g'$ not left the notches of the said wheel the rotation of the armature G with its accessories would not have been possible.

Mechanically a substitute might be found for the windings $i\ i'$ in the power of attraction exercised by $h$ and $h'$, respectively.

Figure 17:
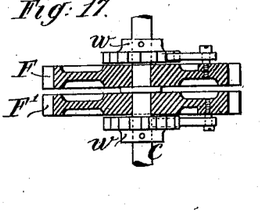
Fig. 17 is a similar section of one form of notched wheel F, secured upon the main shaft.

In Fig. 17 two notched wheels F and F' are shown. These are intended to engage with the armatures $g\ g'$, respectively. The two wheels are mounted with slight friction upon the shaft C, and they are each adapted to be carried around by a ratchet-wheel $w$, secured to the shaft C, the two ratchet-wheels having teeth slanting in opposite directions, one to the right and the other to the left. In this arrangement the coils, such as $i$ and $i'$, become useless, for supposing the armature $g$ sets free the wheel F $g'$ will still remain in gear with the wheel F', though it will in no way interfere with the rotation of the armature G in the direction required to set the switch-arms $m$, $n$, and $n'$ in motion.

We claim as our invention—

1. A distributer for an electric railway having a series of keys to be connected to the spaced contacts of the railway, contact-arms to move over and touch said keys, an electric motor to move the said arms, a locking-wheel moving with the motor, armature-levers to lock the wheel, electromagnets to act on said armature-levers, and an escapement I acted on by said armature-levers to supply current to cause the motor to turn in one direction or the other, according to the direction in which the vehicle travels, substantially as described.

2. A distributer for an electric railway having a series of keys to be connected to the spaced contacts of the railway, three contact-arms to move over and touch said keys, an electric motor to move said arms, a locking-wheel moving with said motor, armature-levers to lock said wheel, electromagnets to act on said armature-levers, each of the electromagnets having a coil connected to one of said contact-arms, and another coil connected to a contact-piece $j\ (j')$ and the motor-coils, an escapement I acted on by the armature-levers to connect one or other of the contact-pieces $j\ j'$ to the current-supply to cause the motor to turn in one direction or the other, according to the direction in which the vehicle travels, substantially as described.

3. The combination of the spaced contacts of an electric-railway system, divided into sections, with a series of distributers, each controlling a section and each having posts $e^2$, $e^3$ and $e^4$ electrically connected one with a key $a^0$ to $a^{20}$, another with the end-spaced contact fed with current by the adjacent distributer on the left, and the third to the end-spaced contact fed with current by the adjacent distributer on the right, and means for automatically putting post $e^2$ into electrical connection with $e^3$ or $e^4$, as the vehicle passes from one section of the way to the next in one direction or the other, substantially as described.

4. The combination of the spaced contacts of an electric-railway system, divided into sections, with a series of distributers each controlling a section and each having a series of keys severally connected to the spaced contacts of its section, contact-arms moving over and touching said keys and posts $e^2$, $e^3$, and $e^4$, electrically connected, one with a key $a^0$ to $a^{20}$, another with the end-spaced contact (such as $y^{19}$ to $y^0$) fed with current by the adjacent distributer on the left, and the third to the end-spaced contact (such as $y^{20}$ to $y'$) fed with current by the adjacent distributer on the right, and a plate, such as L', moving with the above-mentioned contact-arms to close connection between $e^2$ and $e^3$ or between $e^2$ and $e^4$, as the vehicle passes from one section of the way to the next, in one direction or the other substantially as described.

5. A distributer for an electric railway having a series of keys to be connected to the spaced contacts of the railway, contact-arms to move over and touch said keys, an electric motor to move said arms, a locking-wheel secured on the shaft of the moving part of the motor with elastic connections, armature-levers to lock the wheel and electromagnets to act on the armature-levers, substantially as described.

In testimony whereof we have signed our names to this specification in the presence of two subscribing witnesses.

JEAN CLARET.
OLIVIER VUILLEUMIER.

Witnesses:
LION FRANCKENS,
EDWARD P. MACLEAN.